(12) United States Patent
Kirihata

(10) Patent No.: US 9,712,695 B2
(45) Date of Patent: Jul. 18, 2017

(54) IMAGE FORMING APPARATUS, INFORMATION PROCESSING METHOD, AND STORAGE MEDIUM

(71) Applicant: CANON KABUSHIKI KAISHA, Tokyo (JP)

(72) Inventor: Daiji Kirihata, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 14/701,349

(22) Filed: Apr. 30, 2015

(65) Prior Publication Data

US 2015/0317109 A1   Nov. 5, 2015

(30) Foreign Application Priority Data

May 2, 2014   (JP) ................................ 2014-095465

(51) Int. Cl.
G06F 3/16       (2006.01)
G06K 15/02      (2006.01)
H04N 1/00       (2006.01)
G06F 3/12       (2006.01)
H04N 1/44       (2006.01)

(52) U.S. Cl.
CPC ....... H04N 1/00403 (2013.01); G06F 3/1204 (2013.01); G06F 3/1231 (2013.01); G06F 3/167 (2013.01); H04N 1/442 (2013.01)

(58) Field of Classification Search
CPC .......... G06F 3/167; G06F 3/16; G09B 21/006
See application file for complete search history.

(56) References Cited

U.S. PATENT DOCUMENTS

2006/0176505 A1*  8/2006  Burke ............... H04M 3/42221
                                                            358/1.15
2009/0204411 A1*  8/2009  Morikawa et al. ........... 704/275
2009/0268224 A1* 10/2009  Takahashi ................... 358/1.14

FOREIGN PATENT DOCUMENTS

JP       2006-88503 A     4/2006
JP       2010263299    * 11/2010

OTHER PUBLICATIONS

Machine translation of JP Pub 2006088503 to Kajiyama et al.*
Machine translation of JP Pub 2010263299 to Kojima Takashi.*

* cited by examiner

Primary Examiner — Benny Q Tieu
Assistant Examiner — Haris Sabah
(74) Attorney, Agent, or Firm — Canon U.S.A., Inc., IP Division

(57) ABSTRACT

An image forming apparatus includes a display unit configured to display a print target list of printing data corresponding to a login user, and a print control unit configured to execute print processing on data selected by the login user through the print target list displayed by the display unit. The print control unit is configured to execute the print processing on the data corresponding to the login user without selecting the data by the login user through the print target list when voice use setting of the login user is valid.

9 Claims, 14 Drawing Sheets

FIG. 4

401 — INSTRUCTION:INPUT
402 — USER NAME:yamada
403 — PRINT SETTING:NUMBER OF COPIES → 100
        STAPLE/→ON
404 — PRINT DATA STORAGE PATH:/pdldata/0004/qqq
405 — PRINT DATA NAME:DDD.pdf
406 — INPUT DATE AND TIME:2012.12.23 21:53.01

FIG. 5A

USER:yamada  501

| 2012/12/15 12:10:12 | /pdldata/0001/xxx | AAA.txt | 10 COPIES |
| --- | --- | --- | --- |
| 2012/12/17 15:22:52 | /pdldata/0002/yyy | BBB.pdf | DUPLEX PRINTING |
| 2012/12/20 18:40:21 | /pdldata/0003/zzz | CCC.doc | 2in1 5 COPIES |

503　　504　　505　　506

USER:tanaka  502

| 2012/12/19 09:14:05 | /pdldata/0001/xxx | AAA.txt | 10 COPIES |
| --- | --- | --- | --- |
| 2012/12/21 19:24:32 | /pdldata/0002/yyy | BBB.pdf | 2in1 |

FIG. 5B

USER:yamada

| 2012/12/15 12:10:12 | /pdldata/0001/xxx | AAA.txt | 10 COPIES |
| --- | --- | --- | --- |
| 2012/12/17 15:22:52 | /pdldata/0002/yyy | BBB.pdf | DUPLEX PRINTING |
| 2012/12/20 18:40:21 | /pdldata/0003/zzz | CCC.doc | 2in1 5 COPIES |
| 2012/12/23 21:53:01 | /pdldata/0004/qqq | DDD.txt | 100 COPIES STAPLE |

| USER | VOICE SETTING | |
|---|---|---|
| yamada | INVALID | ~901 |
| tanaka | VALID | ~902 |

FIG. 11

| SCREEN | OUTPUT VOICE DATA | VOICE DATA THAT CAN BE INPUT |
|---|---|---|
| PRINT START | PRINTING OF ACCUMULATED PRINT DATA START | — |
| NO ACCUMULATED DOCUMENT | THERE IS NO ACCUMULATED PRINT DATA | — |
| FUNCTION SELECT SCREEN | SELECT FUNCTION YOU WANT TO USE FROM COPY, BOX, SEND, PRINT, AND VARIOUS SETTINGS | "COPY", "BOX", "SEND", "VARIOUS FUNCTIONS", "LOGOUT" |

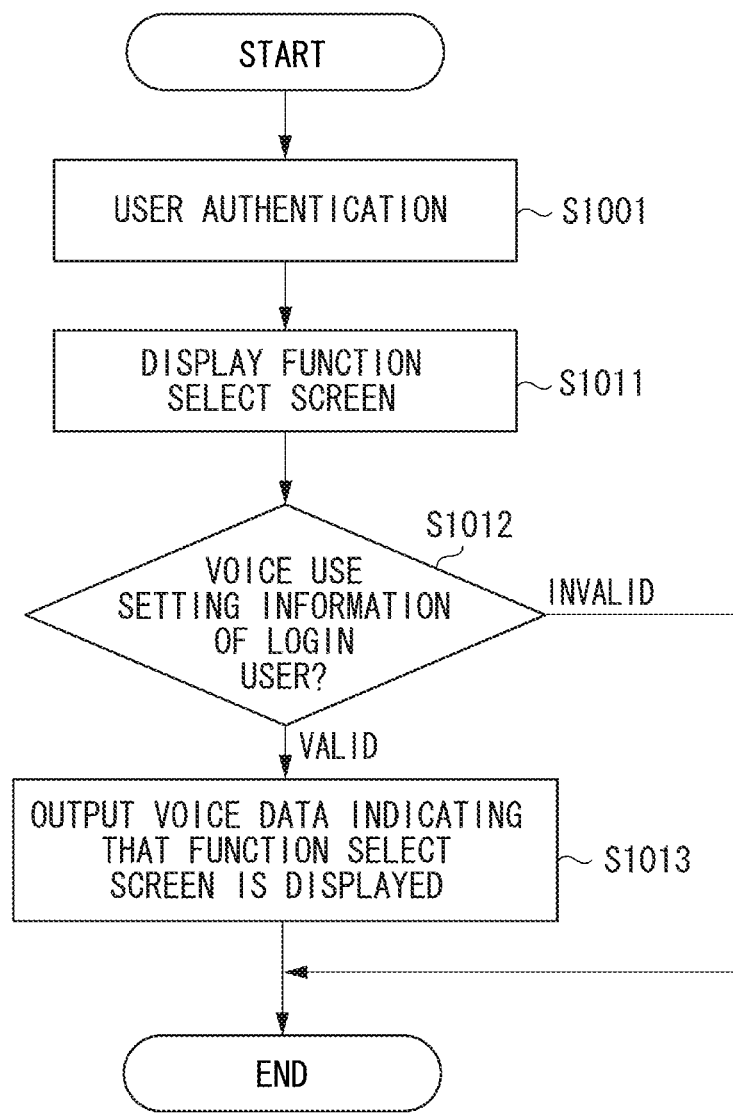

FIG. 13

| SCREEN | OUTPUT VOICE DATA | VOICE DATA THAT CAN BE INPUT |
|---|---|---|
| FUNCTION SELECT SCREEN | SELECT FUNCTION YOU WANT TO USE FROM COPY, BOX, SEND, PRINT, AND VARIOUS SETTINGS | "COPY", "BOX", "SEND", "VARIOUS FUNCTIONS", "LOGOUT" |
| COPY | PLACE DOCUMENT TO BE SCANNED, AND THEN INPUT COPY START | "COPY START", "CANCEL", "LOGOUT" |
| BOX | SELECT STORE OR PRINT OF DATA | "STORE", "PRINT, "CANCEL", "LOGOUT" |
| SEND | SELECT DESTINATION FROM ADDRESS BOOK OR DIRECT-INPUT DESTINATION | "ADDRESS BOOK", "DIRECT INPUT", "CANCEL", "LOGOUT" |
| PRINT | ACCUMULATED PRINT DATA WILL BE PRINTED | "CANCEL", "LOGOUT" |
| SETTINGS | SELECT ITEM FROM PRINT SETTING, USER SETTING, AND OTHER SETTINGS | "PRINT SETTING", "USER SETTING", "OTHER SETTING", "CANCEL", "LOGOUT" |

~1301

IMAGE FORMING APPARATUS, INFORMATION PROCESSING METHOD, AND STORAGE MEDIUM

BACKGROUND OF THE INVENTION

Field of the Invention

The present invention relates to an image forming apparatus, an information processing method, and a storage medium.

Description of the Related Art

Some conventional image forming apparatuses accumulate print data (print job) from a terminal apparatus such as a personal computer (PC), in an image processing apparatus. A user of such an image forming apparatus needs to go through a procedure of selecting predetermined print data from a print data list displayed on the image forming apparatus, and issuing a print instruction to print the accumulated print data.

However, it might be difficult for some of the users of the image forming apparatus such as a visually impaired person to normally operate the apparatus. For such users, some image forming apparatuses (for example, Japanese Patent Application Laid-Open No. 2006-88503) have a voice input/output function. Thus, the image forming apparatus can give voice guidance on an operation procedure and operate based on received voice.

SUMMARY OF THE INVENTION

The present invention is directed to enabling a user of a voice input/output function to easily print accumulated print data.

An image forming apparatus according to an aspect of the present invention includes a display unit configured to display a print target list of printing data corresponding to a login user, and a print control unit configured to execute print processing on data selected by the login user through the print target list displayed by the display unit. The print control unit is configured to execute the print processing on the data corresponding to the login user without selecting the login user through the print target list when voice use setting of the login user is valid.

With the present invention, a voice function user can also easily perform printing.

Further features of the present invention will become apparent from the following description of exemplary embodiments with reference to the attached drawings.

BRIEF DESCRIPTION OF THE DRAWINGS

FIG. 4 is a diagram illustrating an example of print data management information.

FIGS. 5A and 5B are diagrams illustrating an example of a print data management information list.

FIG. 9 is a diagram illustrating an example of voice operation setting information.

FIG. 11 is a first diagram illustrating an example of voice data.

FIG. 12 is a second flowchart illustrating an example of information processing in the image forming apparatus.

FIG. 13 is a second diagram illustrating an example of voice data.

DESCRIPTION OF THE EMBODIMENTS

Figure 1:
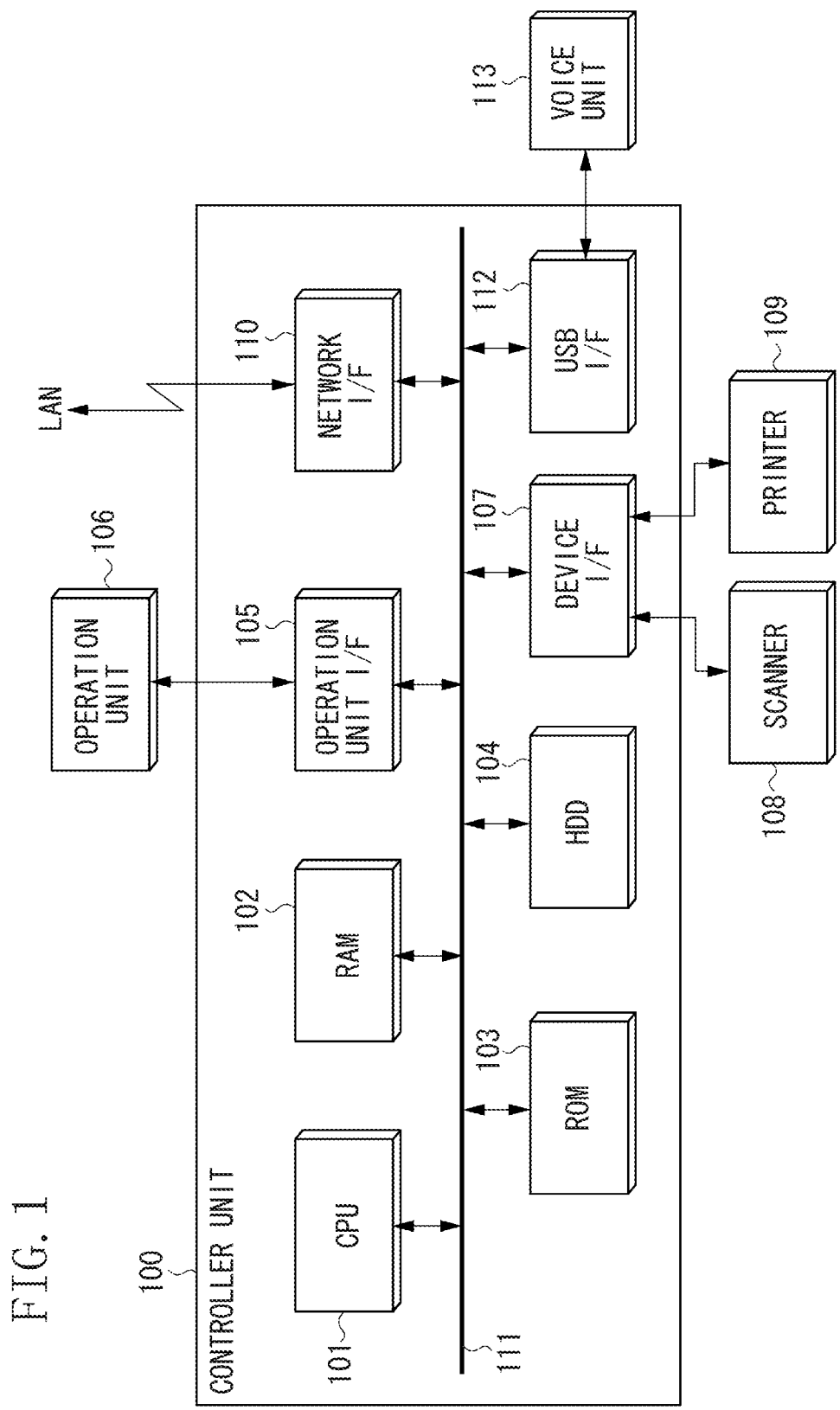
FIG. 1 is a diagram illustrating an example of a hardware configuration of an image forming apparatus.

A first exemplary embodiment is described below. FIG. 1 is a diagram illustrating an example of a hardware configuration of an image forming apparatus. A controller unit 100 is a device that controls the image forming apparatus. A central processing unit (CPU) 101 is a processing device for controlling the entire system. The CPU 101, a random access memory (RAM) 102, a read only memory (ROM) 103, a hard-disk drive (HDD) 104, an operation unit I/F 105, a device I/F 107, and a network I/F 110 are connected to the system bus 111. The CPU 101 controls all the devices connected to the system bus 111. The RAM 102 is a system network memory on which the CPU 101 operates, and is also an image memory for temporarily storing image data. In the RAM 102, a program such as an operating system, system software, and application software as well as data are loaded. The ROM 103 stores a boot program for the system. The ROM 103 may further store a system program, an application program, and information such as fonts required for the image forming apparatus. The HDD 104 stores programs such as an operating system, system software, and application software, as well as image data, setting information, and the like. The program stored in the RAM 102 is executed by the CPU 101 so that the image data or the data other than the image data stored in the RAM 102, the ROM 103, and the HDD 104 are processed. A small image forming apparatus may have a hard-disk-less configuration in which the HDD 104 is not installed, and the programs such as the system software and the application software are stored in the ROM 103. Alternatively, a storage device involves no hard disk, and a flash memory, namely, a solid state disk (SSD) may be used instead of the HDD 104.

When the CPU 101 executes processing based on the program stored in the ROM 103 or the HDD 104, a software configuration of the image forming apparatus and processing in a flowchart as described below are implemented.

The controller unit 100 includes the operation unit I/F 105, the device I/F 107, and the network I/F 110. The operation unit I/F 105 is connected to an operation unit 106. The operation unit 106 is a device for operating the image forming apparatus, and includes a display device and an operation button. The display device is a device such as a touch panel for notifying the user of a state of the image forming apparatus or receiving the operation from the user. The operation button is used for issuing an instruction to the image forming apparatus. The controller unit 100 is connected to an image input/output device such as a scanner 108 and a printer 109 through the device I/F 107 that carries out image data input and output. Image data input from the scanner 108 through the device I/F 107 is stored in the RAM 102 or the HDD 104. The stored image data is processed in image processing and the like executed by the CPU 101 that executes processing based on an application program stored in the RAM 102, as appropriate. Similarly, when the image data is output, the image data is output to the printer 109 through the device I/F 107. The network I/F 110, through which the image forming apparatus is connected to a local area network (LAN), is used for inputting or outputting image data in an external device such as a network, or information for controlling the image forming apparatus. A USB I/F 112, through which the controller unit 100 is connected to a voice unit 113 as a voice input/output device, is used for inputting and outputting voice data. The voice data input from the voice unit 113 through the USB I/F 112 is processed in voice analysis processing and the like executed by the CPU 101 that executes processing based on the application program stored in the RAM 102, as appropriate. Similarly, when the voice data is output, the voice data is output to the voice unit 113 through the USB I/F 112. The voice unit 113 does not have to be connected through the USB I/F 112, and may be connected through a different I/F. A PC described below also has a hardware configuration including a CPU and a memory such as a RAM, a ROM, and an HDD. When the CPU executes processing based on the program stored in the RAM, the ROM, or the HDD, the functions and the like of the PC are implemented.

The configuration of the image forming apparatus is not limited to the configuration illustrated in FIG. 1. For example, in an image forming apparatus having a FAX function, the controller unit 100 includes an I/F for a modem device not illustrated in FIG. 1. Thus, the FAX can be transmitted as the image forming apparatus is connected to a public line through the modem. In the present exemplary embodiment, the scanner 108 as the image input/output device is connected. However, the scanner 108 may not necessarily be connected, and only the printer 109 may be connected.

Figure 2:
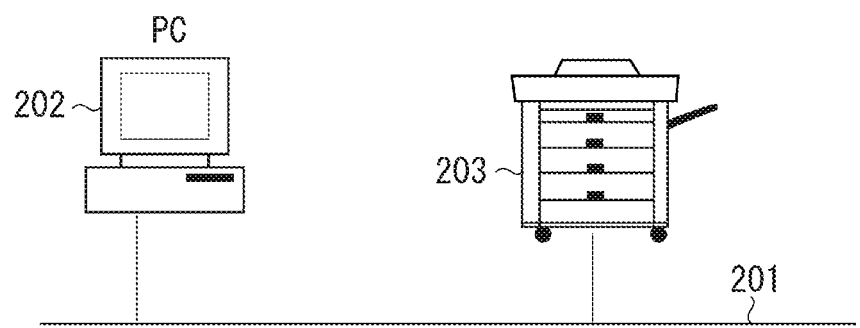
FIG. 2 is a diagram illustrating an example of a system configuration of a print system.

FIG. 2 is a diagram illustrating a system configuration of a print system. A client PC 202 and an image forming apparatus 203 are connected to a LAN 201.

User authentication for the image forming apparatus 203 is described. The image forming apparatus 203 may restrict its use to only a predetermined user who can use the apparatus, or make the user operate the apparatus after the user authentication is performed so that the operation of the user is recorded. For example, information (user name and password of the user) related to the authentication is stored as a user database in the HDD 104 in the image forming apparatus 203. Before the user uses the image forming apparatus 203, the CPU 101 displays an authentication screen on the operation unit 106, through which the user name and the password are input. The CPU 101 permits the user to operate the image forming apparatus 203 only when the user name and the password that have been input match the user database. Alternatively, the image forming apparatus 203 may be a domain in an authentication system such as Active Directory. In such a case, the image forming apparatus 203 does not include the user database, and the CPU 101 makes inquiry to an external authentication server on the network to find out if the user information input by the user, is valid. Alternatively, the CPU 101 may perform the authentication by using an IC card or the like storing information required for the authentication. Also when the image forming apparatus 203 is used through a network, the CPU 101 requests the connection source for the authentication, so that only the authenticated user can use the image forming apparatus 203. This processing is executed, for example, when the user is connected to the image forming apparatus 203 through a browser or with a file sharing protocol.

[Input Print Data from PC]

An example where the user inputs print data from the client PC 202 to the image forming apparatus 203, in which the authentication is managed, will be described.

In the present exemplary embodiment, as an example, page description language (PDL) data as the print data is transmitted to the image forming apparatus 203. The image forming apparatus 203 interprets the PDL and performs the printing. The print data may be image data such as TIFF, other than the PDL data. Any print data in a format that can be interpreted and printed by the image forming apparatus 203, such as a document format of an application, for example, may be used.

The user performs an operation to start a printer driver through an application of the client PC 202. The user selects a desired image forming apparatus from a screen of the printer driver, and issues a print instruction. When the print instruction is transmitted to the image forming apparatus 203, the image forming apparatus 203 requests the printer driver of the client PC 202 to perform the authentication. The printer driver of the client PC 202 displays an authentication screen illustrated in FIG. 8, as described later. When the user inputs the user name and the password, the user name and the password that have been input are transmitted to the image forming apparatus 203 from the client PC 202. When the user name and the password match in the image forming apparatus 203, information indicating the use permission is transmitted to the client PC 202. When the user name and the password do not match, the printing in the client PC 202 ends in an error. The client PC 202 converts data of the application into PDL data, and transmits information related to the user (user name and the like), print control information, including print setting information such as duplex printing, and the print data (PDL data) to the image forming apparatus 203. Authentication information in the image forming apparatus 203 may be used in the authentication. When the PC and the image forming apparatus 203 are in the same authentication domain and the authentication result of the client PC 202 is guaranteed, as in Active Directory, the authentication may not be performed in the image forming apparatus 203, and the print control information may include information on the user of the client PC 202. In the present exemplary embodiment, an example where the authentication is performed in the client PC 202 is described. However, the user name may not be authenticated when input from the client PC 202, and the print control information may include the user name input to the client PC 202. Also in this case, when a user name that is the same as this user name is registered in the image forming apparatus 203, the printing is performed after the authentication of the user is performed that uses the image forming apparatus 203. Thus, the printing by an unauthorized user can be prevented.

[Reception of Print Data by Image Forming Apparatus]

Figure 3:
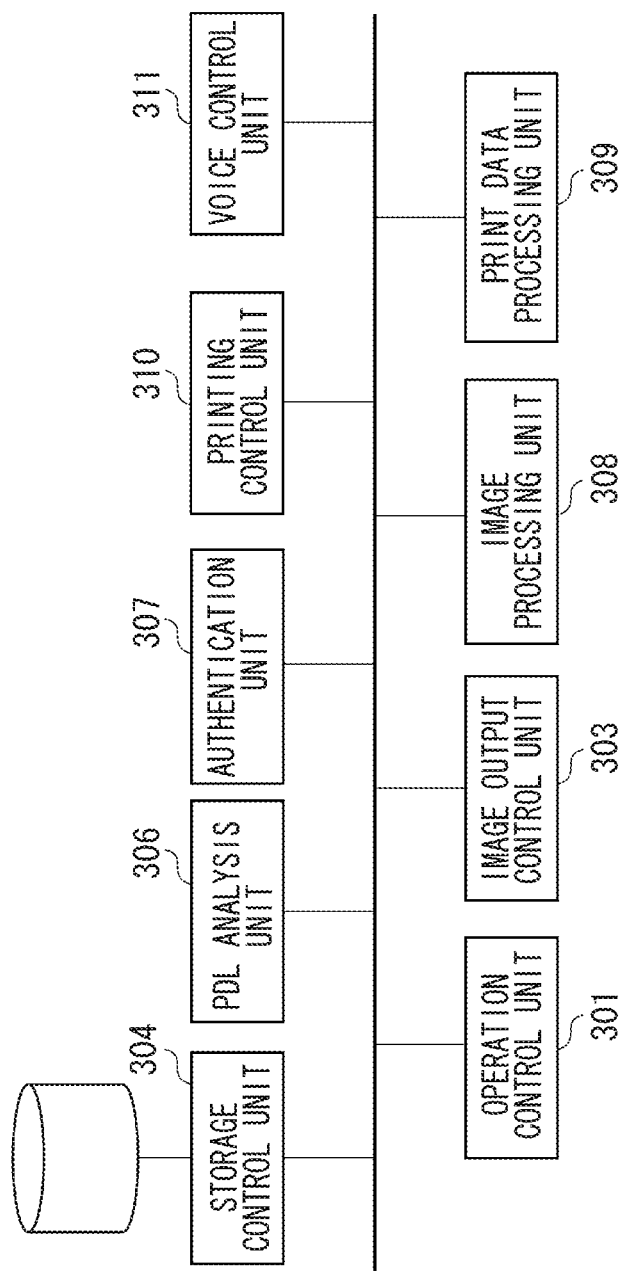
FIG. 3 is a diagram illustrating an example of a software configuration of the image forming apparatus.

An example of the software configuration of the image forming apparatus 203 is described with reference to FIG. 3. As described above, the CPU 101 executes the processing based on the program stored in the HDD 104 and the like, whereby the software configuration illustrated in FIG. 3 is implemented. FIG. 3 only illustrates software components required for describing the present exemplary embodiment. For example, other components such as a FAX processing unit may be provided.

A case is described where the PDL data is transmitted to the image forming apparatus 203 and printed, by using the printer driver from an application software of devices such as an external client PC connected to the network. The CPU 101 may interpret the PDL based on the program stored in the ROM 103 or the HDD 104, or the PDL may be interpreted with dedicated hardware for a PDL interpreter. Detailed description of the printer driver and the PDL interpretation is omitted.

As described above, the PDL data generated by the printer driver and the like in the client PC 202 and the print control information including the print setting information related to the print setting for the PDL data and the user information, are transmitted to the image forming apparatus 203 through the LAN 201. In the present exemplary embodiment, an example where the PDL data and the print control information are separately transmitted is described. Alternatively, the PDL data may include the print control information, and the print control information may be extracted by a PDL analysis unit 306 described below. The image forming apparatus 203 receives the PDL data transmitted from the network I/F 110 connected to the LAN 201 through a print control unit 310. The print control unit 310 requests a storage control unit 304 to store the received PDL data. Thus, the PDL data is stored in the RAM 102 or the HDD 104 through the system bus 111. At the same time, the image forming apparatus 203 receives the print control information transmitted from the network I/F 110 connected to the LAN 201 through the print control unit 310.

In the present exemplary embodiment, the image forming apparatus 203 does not perform the printing when the print data is received and performs the printing after the user authentication is performed in the image forming apparatus 203. Specifically, the following operation is performed. A print data processing unit 309 receives the print control information and information indicating where the PDL data is stored by the storage control unit 304. The print data processing unit 309 is a processing unit that manages the PDL data stored in the image forming apparatus 203. The print data processing unit 309 stores, as print data management information, the print control information, the information indicating where the PDL data is stored by the storage control unit 304, and print data input date and time. FIG. 4 is a diagram illustrating an example of the print data management information. The type of instruction is described in instruction 401. In this example, print data is input, and thus the instruction 401 is "input". The user name is described in user name 402 based on the print control information. The print setting information is described in print setting 403. A path in which the PDL data in the image forming apparatus 203 is stored is described in print data storage path 404. In the example illustrated in FIG. 4, the print data storage path 404 is "/pdldata/1025/qqq". A print data name is described in print data 405. The print data name is the name displayed when a print target list described below is displayed. The name is automatically given when the printing is instructed through the client PC 202, or is designated by the user when the printing is performed by the printer driver. Date and time when the print data is input are described in input date and time 406.

An example of a print data management information list managed by the print data processing unit 309 is illustrated in FIG. 5. A list 501 is a print data management information list of a user, yamada. A list 502 is a print data management information list of a user, tanaka. The print data processing unit 309 stores the print data management information list for each user. The print data management information list for each user includes print data input date and time 503, storage location 504 of the print data in the image forming apparatus 203, print data name 505, and print setting information 506 that are each included in the print data management information described above. When the print data management information illustrated in FIG. 4 is received, the print data processing unit 309 adds the received information to the list 501 for the user yamada. Thus, the print data management information list as illustrated in FIG. 5B is generated. Information 507 represents the added information.

An authentication unit 307 that performs the authentication is described later.

[Display Print Target List]

An example is described where the authentication of the user is performed in the image forming apparatus 203, and the print target list is displayed so that the print data input to the image forming apparatus 203 is printed after the user logs in. As detailed processing executed for the authentication, the CPU 101 acquires voice use setting information and print data automatic print information after login setting that are associated with the authenticated user and stored in the RAM 102 or the HDD 104. The CPU 101 executes processing after login is performed in accordance with the setting information. An example is described below where the voice use setting information and the print data automatic print information after login setting are invalid.

Figure 6:
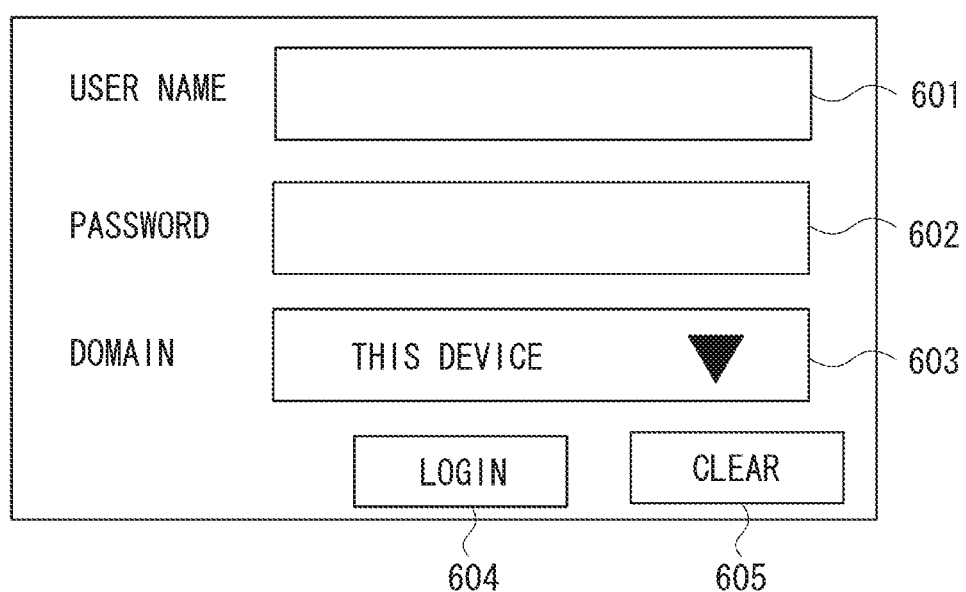
FIG. 6 is a diagram illustrating an example of an authentication screen.

The user performs an operation related to the authentication to use the image forming apparatus 203. The image forming apparatus 203 displays a screen for the user to input a user name 601 and a password 602 as illustrated in FIG. 6, on the operation unit 106. In the screen, domain 603 is a field for selecting an authentication location. The user selects the authentication location in the domain 603. The screen illustrated in FIG. 6 represents a state where the authentication is performed in the image forming apparatus 203. When a button 604 is pressed, the image forming apparatus 203 executes the authentication processing on the user. When a button 605 is pressed, the image forming apparatus 203 clears the user name 601 and the password 602 that have been input, without executing the authentication processing. When the button 604 is pressed, the image forming apparatus 203 executes login processing. More specifically, the user name and the password, respectively input to the user name 601 and the password 602 on the operation unit 106, are transmitted to the authentication unit 307 through the operation unit I/F 105. The authentication unit 307 performs user authentication by checking whether the user database stored in the HDD 104 of the image forming apparatus 203 includes the matching user name and password. How the authentication is performed is not limited to this, and other authentication methods such as using a contactless IC card may be employed. Further, the authentication information may not be locally stored, and the authentication may be performed by the external authentication server as in Active Directory and the like. In such a case, the authentication unit 307 makes an inquiry to the external authentication server. The user switches the domain 603 to select the authentication location as described above.

Figure 7:
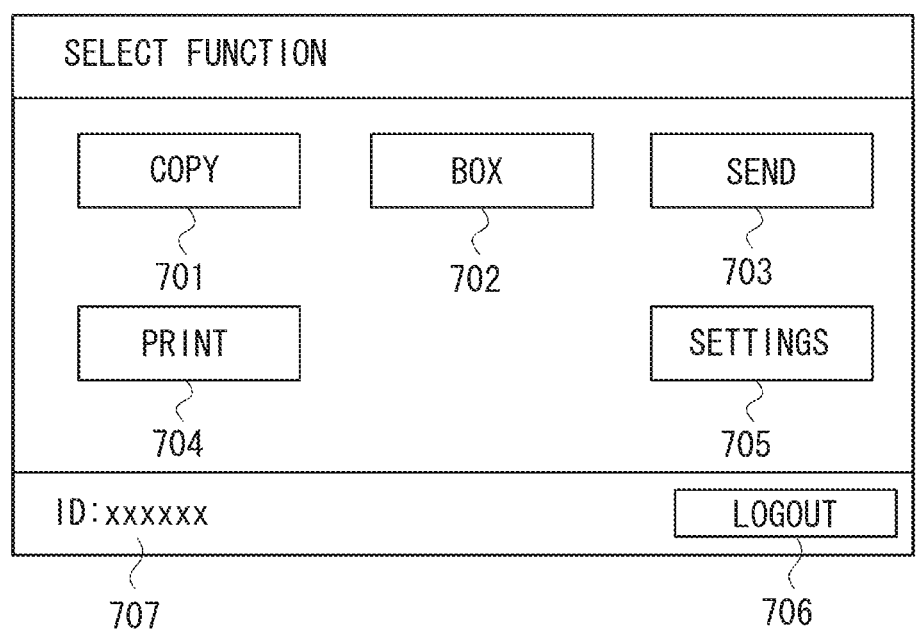
FIG. 7 is a diagram illustrating an example of a function list screen.
Figure 8:
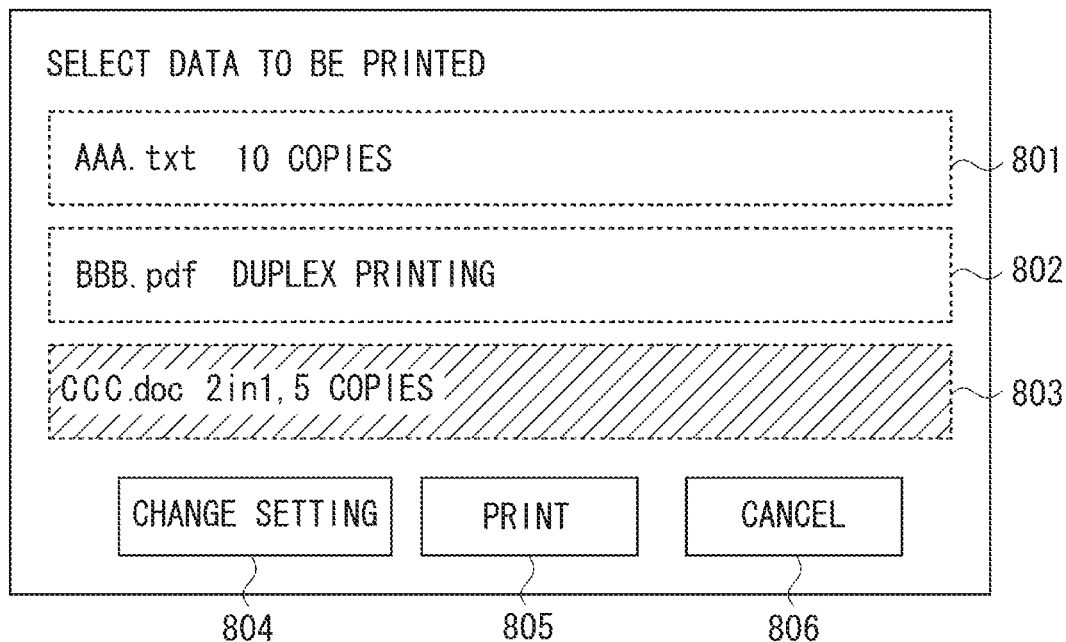
FIG. 8 is a diagram illustrating an example of a print target list display screen.

A case where the user has been authenticated and logs into the image forming apparatus 203, and requests a print data list of the user is described as an example. In the present exemplary embodiment, as an example, a function list screen in FIG. 7 is displayed after the login, and the user selects a print function in the function list screen to request the print target list. The image forming apparatus 203 may display the print target list immediately after the user logs in. Alternatively, whether the print target list is immediately displayed after the login may be settable for each user or each image forming apparatus. In the image forming apparatus 203, a screen on which the function used by the user is selected is displayed on the operation unit 106. The user can use each function by pressing an appropriate one of function buttons 701, 702, 703, 704, and 705 in FIG. 7. Upon detecting that a button 706 is pressed, the image forming apparatus 203 performs user logout. Upon detecting that the button 704 is pressed, the operation unit 106 displays a print target list display screen in FIG. 8. Here, the authentication unit 307 transfers information on the user name to an operation control unit 301. The operation control unit 301 further transfers the information on the user name thus transferred to the print data processing unit 309. The print data processing unit 309 checks whether the print data management information list corresponding to the received user name exists. When the list exists, print data processing unit 309 generates a print target list including information on print data of the same user name, and transmits the list to the operation control unit 301. For example, the print target list similar to the print data management information list for each user illustrated in FIG. 5 is transmitted to the operation control unit 301. For example, a case is described where the print data management information list is in the state illustrated in FIG. 5A, and the print target list of the user yamada is requested. In this case, the print data processing unit 309 transmits the print data management information list of the user yamada as the print target list. The print data processing unit 309 may extract only the information required for displaying the list from the print data management information list and transmit the information. When there is no print data management information corresponding to the designated user, the print data processing unit 309 transmits an empty print target list. The operation control unit 301 displays the print data of the print target list thus acquired on the operation unit 106 of the image forming apparatus 203. FIG. 8 illustrates an example of the print target list displayed on the operation unit 106. According to an illustration in FIG. 8, the user has input three pieces of print data 801, 802, and 803. In FIG. 8, not only the print data of the print targeted by the user, but also the print setting information is displayed. The user selects desired print data, and presses a button 804 to change the print setting information, or presses a button 805 to instruct printing. The user can also display a setting change screen and change the setting of the number of copies, staple setting information, and the like. FIG. 8 illustrates a state where the data 803 has been selected. When the user presses the button 805 in this state, the print data represented by the data 803 is printed. Upon detecting that a cancel button 806 has been pressed, the image forming apparatus 203 terminates the processing without executing the printing.

[Printing]

A case is described where the user has been authenticated by the image forming apparatus 203 and logs in, and then selects one print target from the print target list displayed on the operation unit 106 and instructs the printing.

The print data processing unit 309 of the image forming apparatus 203 checks the storage location information of the print data based on the selected print data management information, and transfers the print data thus found to the PDL analysis unit 306. The PDL analysis unit 306 converts the print data into data printable by the image forming apparatus 203. In what follows, the stored print data is the PDL data and its printing method is described in detail below. As described above, the PDL may be interpreted by the CPU 101 that executes processing based on the program stored in the ROM 103 or the HDD 104, or may be interpreted with the dedicated hardware for the PDL interpreter.

The PDL analysis unit 306 interprets the stored print data, and converts the print data into data in a format printable by the image forming apparatus 203. The storage control unit 304 stores the data obtained by the conversion, in the RAM 102 or the HDD 104. The PDL analysis unit 306 instructs an image output control unit 303 to print the image data that is stored by the storage control unit 304 and has been converted into a format printable by the image forming apparatus 203 to output the received print data. The image output control unit 303 instructs an image processing unit 308 to execute image processing on the data stored by the storage control unit 304 in accordance with print setting information in the print control information in the print target list. Here, when the user has changed the setting information, the image output control unit 303 executes the processing in accordance with the changed setting information. When the image editing performed by the image processing unit 308 for the purpose of outputting is completed, the image output control unit 303 causes the storage control unit 304 to read out the image data as a result of the image processing from the RAM 102 or the HDD 104. The image data as a result of the image processing is transmitted to the printer 109 through the system bus 111 and the device I/F 107. The printer 109 sequentially prints the transmitted data on sheets to be output. In the present exemplary embodiment, a case where the print data is PDL is described as an example. Alternatively, other formats may be subjected to the interpretation. For example, when the print data is a JPEG image, the JPEG is interpreted by the image forming apparatus 203 and the print data is converted into data printable by the image forming apparatus 203.

When the printing is completed, the image output control unit 303 issues a notification indicating that the print data has been printed, to the print data processing unit 309. Upon receiving the notification, the print data processing unit 309 deletes the print data and the print data management information in a case where the print data is deleted as soon as the printing is completed. The print data processing unit 309 records information indicating that the print data has been printed and keeps the print data and the print data management information in a case where the print data is held for a predetermined period. In the present exemplary embodiment, the notification is issued after the printing is completed. Alternatively, the image output control unit 303 may issue the notification to the print data processing unit 309 when the printing is started or while the printing is in process, as appropriate.

[Determination to Use Voice Function]

An example of a case where the user uses the voice function of the image forming apparatus 203 is described. When the voice function is used, a voice control unit 311 outputs voice data corresponding to what is displayed on the operation unit 106 through a voice unit 113. Thus, the user who operates the image forming apparatus 203 can recognize the state of the image forming apparatus 203. Furthermore, the image forming apparatus 203 can receive the voice data. The voice control unit 311 analyzes the voice data received through the voice unit 113. Upon determining that the voice data is an instruction to the image forming apparatus 203, processing corresponding to the instruction is executed. In the present exemplary embodiment, setting information indicating whether the voice function is used is stored as voice use setting information associated with the user name in the RAM 102 or the HDD 104. The processing unit or the control unit can acquire the voice use setting information through the storage control unit 304. The processing unit or the control unit acquires the voice use setting information associated with the user name authenticated by the operation control unit 301 at the time of user authentication, from the RAM 102 or the HDD 104 through the storage control unit 304. The processing unit or the control unit turns ON the voice function when the voice function user setting information is valid. The voice function may be constantly available before the authentication, or may become available when the user performs a predetermined procedure after the authentication.

FIG. 9 is a diagram illustrating an example of the voice use setting information stored for each user in the RAM 102 or the HDD 104 of the image forming apparatus 203. In the present exemplary embodiment, the setting information indicating whether the print data is automatically printed after the user logs into the image forming apparatus 203 is also stored. A record 901 indicates that the voice function is invalid for the user yamada. A record 902 indicates that the voice function is valid for the user tanaka. In this case, the voice control unit 311 is not operated when the user yamada is subjected to the authentication, and the voice control unit 311 is operated and the voice function is feasible when the user tanaka is authenticated.

[Authentication Including Voice Setting Determination]

Figure 10:
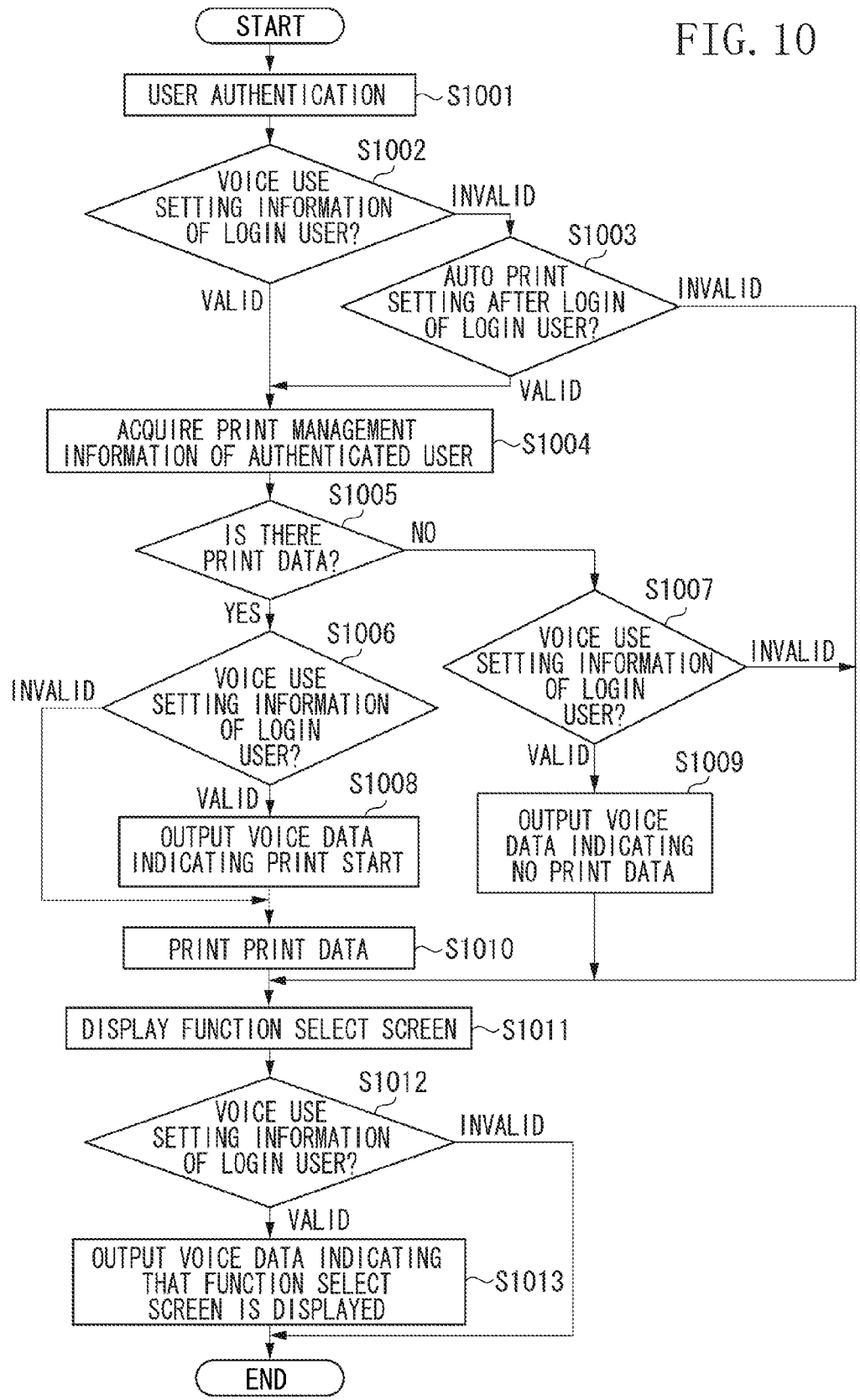
FIG. 10 is a first flowchart illustrating an example of information processing in the image forming apparatus.

An example of information processing including determining whether the voice use setting information can be used by the authenticated user in the image forming apparatus 203 after the authentication, is described with reference to FIG. 10.

In step S1001, the image forming apparatus 203 executes the user authentication. The detail of the authentication processing has been described above and thus will not be described.

In step S1002, the operation control unit 301 acquires the voice setting information associated with the user name, from the RAM 102 or the HDD 104 through the storage control unit 304, and determines whether the voice use setting information is valid. The processing proceeds to step S1004 when the voice use setting information is valid (VALID in step S1002), and proceeds to step S1003 when the voice use setting information is invalid (INVALID in step S1002).

In step S1003, the operation control unit 301 acquires the auto print after login setting information associated with the user name, from the RAM 102 or the HDD 104 through the storage control unit 304. The processing proceeds to step S1004 when the auto print after login setting information is valid (VALID in step S1003), and proceeds to step S1011 when the auto print after login setting information is invalid (INVALID in step S1003).

In step S104, the operation control unit 301 acquires print data management information associated with the user name of the login user, from the print data processing unit 309.

In step S1005, the operation control unit 301 refers to the acquired print data management information, and checks whether the print data of the login user exists. The determination processing in step S1005 is an example of processing of determining the print data. The processing proceeds to step S1006 when the print data exists (Yes in step S1005), and proceeds to step S1007 when the print data does not exist (No in step S1005).

In step S1006, the operation control unit 301 checks the voice use setting information as in step S1002, and proceeds to step S1008 when the voice use setting information is valid (VALID in step S1006), and proceeds to step S1010 when the voice use setting information is invalid (INVALID in step S1006).

In step S1007, the operation control unit 301 checks the voice use setting information as in step S1002, and proceeds to step S1009 when the voice use setting information is valid (VALID in step S1007), and proceeds to step S1011 when the voice use setting information is invalid (INVALID in step S1007).

In step S1008, the operation control unit 301 issues a notification indicating that the printing starts to the voice control unit 311. The voice control unit 311 acquires the voice data indicating that the printing starts, stored in the RAM 102 or the HDD 104 in advance through the storage control unit 304, and outputs the voice data through the voice unit 113.

In step S1009, the operation control unit 301 issues a notification indicating that there is no print data to the voice control unit 311. The voice control unit 311 acquires the voice data, indicating that there is no accumulated print data, stored in the RAM 102 or the HDD 104 in advance through the storage control unit 304, and outputs the voice data through the voice unit 113.

In step S1010, the operation control unit 301 issues a notification indicating that the print data of the corresponding user is to be printed, to the print data processing unit 309. The print data processing unit 309 performs control such that the print data in the print data management information of the user is printed.

The print data to be printed in the processing according to the flowchart may be all the print data associated with the information on the authenticated user, or may be only the newest print data as a target of a print instruction from the client PC 202. The print data that has already been printed may be print data that has been eliminated from the print target.

In step S1011, the operation control unit 301 controls display processing of the function select screen, and causes the operation unit 106 to display the function select screen.

In step S1012, the operation control unit 301 checks the voice use setting information as in step S1002, and the processing proceeds to step S1013 when the voice use setting information is valid (VALID in step S1012), and is terminated when the voice use setting information is invalid (INVALID in step S1012).

In step S1013, the operation control unit 301 issues a notification indicating that the function select screen is displayed on the voice control unit 311. The voice control unit 311 outputs the voice data indicating that the function select screen is displayed, stored in the RAM 102 or the HDD 104 in advance through the voice unit 113. The voice control unit 311 further acquires information on voice data that can be received when the function select screen is displayed. Then, the processing in the flowchart illustrated in FIG. 10 is terminated.

FIG. 11 is a diagram illustrating an example of voice data output from the voice control unit 311 through the voice unit 113 and the voice data analyzed by the voice control unit 311 when the screen is displayed. This data is stored in the RAM 102 or the HDD 104 in advance.

Information 1101 is information on the voice data used in step S1008. The voice output in step S1008 is "printing of accumulated print data starts". In this case, the voice control unit 311 does not receive any voice.

Information 1102 is information on the voice data used in step S1009. The voice output in step S1009 is "there is no accumulated print data". Also in this case, the voice control unit 311 does not receive any voice.

Information 1103 is information on the voice data used in step S1013. The voice output in step S1013 is "select function you want to use from copy, box, send, print, and various settings". When the voice data received thereafter from the user by the voice unit 113 includes "copy", "box", "send", "various functions", and "logout", the voice control unit 311 performs an analysis, and performs control associated with included voice data. The instruction may be issued without using the voice data. More specifically, the operation unit 106 may include hard keys and the like to which specific functions are allocated. The user uses and controls the specific functions by pressing the hard key.

In the present exemplary embodiment, the user of the image forming apparatus 203 who uses the voice function can automatically print the print data accumulated in the image forming apparatus 203 upon detecting that the voice setting information is valid. Thus, the printing can be performed without individually selecting every print data, accumulated in the image forming apparatus 203.

In the second exemplary embodiment, an example of a case is described where the printing is not immediately performed even when the voice setting information of the login user is valid at the time when the user authentication is performed.

Processing for the authentication in the present exemplary embodiment is illustrated in FIG. 12. The processing is the same as that in FIG. 10 except that some steps are omitted, and the processing in each step is the same as the counterpart in FIG. 10.

FIG. 13 is diagram illustrating an example of voice data that corresponds to the screen displayed on the operation unit 106 of the image forming apparatus 203 and is output from the voice control unit 311 through the voice unit 113. Furthermore, an example of the voice data received by the voice control unit 311 through the voice unit 113 when the screen is displayed is illustrated. These pieces of voice data are stored in the RAM 102 or the HDD 104 as in the case of the voice data described with reference to FIG. 11. An example of a case is described where a screen transition input is received in a state where the function select screen is displayed after the user about which the voice setting information is valid has been authenticated. For example, the operation unit 106 detects that the user has pressed a copy button. Alternatively, the voice control unit 311 detects that the voice "copy" is input from the user. Then, the operation control unit 301 executes processing of transitioning to a copy screen, and thus displays the copy screen on the operation unit 106. The operation control unit 301 issues a notification indicating that the voice data related to the copy function is to be output to the voice control unit 311. The voice control unit 311 acquires the corresponding voice data through the storage control unit 304, and outputs the voice data through the voice unit 113. When the copying is performed, the output voice data is "place document to be scanned, and then input copy start". The voice data that can be received by the voice control unit 311 after the voice data is output from the voice unit 113, is "copy start", "cancel", and "logout".

Figure 14:
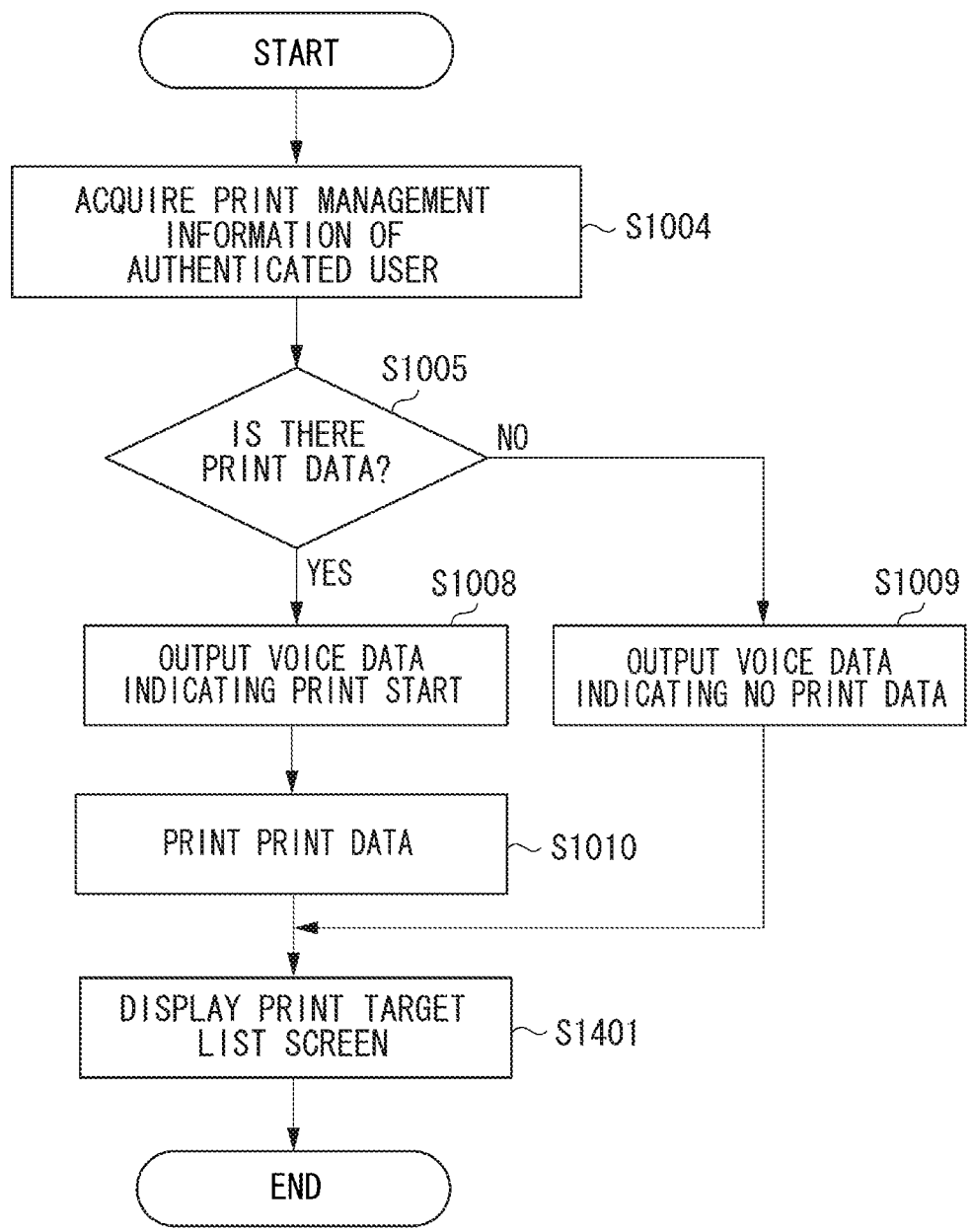
FIG. 14 is a third flowchart illustrating an example of information processing in the image forming apparatus.

FIG. 14 is a flowchart illustrating an example of information processing in a case where print is selected in the function select screen. The processing in each step is the same as the counterpart in FIG. 10.

In step S1401, the operation control unit 301 causes the operation unit 106 to display the print target list screen.

In the present exemplary embodiment, the accumulated print data can be printed when the user who uses the voice function selects a predetermined function. The second exemplary embodiment is different from the first exemplary embodiment in that the printing is not automatically started after the login. Thus, the user who uses the function other than the printing of the print data input from the client PC 202 and the like can prevent the printing from being executed when not necessary. The print data input from the client PC 202 can be printed without performing the selection from the document list, and thus the user can perform the printing without a cumbersome procedure.

In the present exemplary embodiment, whether the voice use setting is valid or invalid is determined, and the printing automatically starts after login when the voice use setting is valid. Alternatively, the following configuration may be employed.

For example, whether the function of automatically performing printing after login is valid or invalid may be set for each user. More specifically, the function may be set to be valid for a visually impaired user and may be set to be invalid for a non-disabled user.

In the present exemplary embodiment, the voice use setting is stored for each user. Alternatively, the voice use setting may be stored as a setting unique to the apparatus. In such a case, the auto print after login function may be automatically used and procedure of selecting data from the print target list may be prohibited when the voice use setting as the setting unique to the apparatus is valid.

Other Embodiment

The present invention may be implemented through the following processing. Specifically, a program that implements at least one function of the exemplary embodiments described above is supplied to a system or an apparatus through a network or a storage medium, and then is readout and executed by at least one processor in a computer in the system or the apparatus. The present invention may be implemented by a circuit (application specific integrated circuit (ASIC)) that implements at least one function.

With the exemplary embodiments described above, a voice function user can also easily perform printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095465, filed May 2, 2014, which is hereby incorporated by reference herein in its entirety.

What is claimed is:

1. An image forming apparatus comprising:
a storing unit configured to store print data corresponding to a login user; and
a printing unit configured to print an image on a sheet;
an operation unit configured to receive a user instruction;
a voice unit configured to receive voice input data or output voice data, the receipt of voice input data and output of voice data occurring at the image forming apparatus;
a setting unit configured to set voice setting information indicating whether or not the voice unit is operational; and
a print control unit configured to execute a first print control or a second print control based on the voice setting information set by the setting unit,
wherein, the first print control being executed when the print control unit determines that the voice setting information indicates that the voice unit is not operational, the print control unit causes the operation unit to display a list of the print data and to causes the printing unit to print the image on the sheet based on receiving selection of the displayed list of the print data from the login user via the operation unit, and
wherein, the second print control being executed when the print control unit determines that the voice setting information indicates that the voice unit is operational, the print control unit does not display the print data list and causes the printing unit to print the image automatically on the sheet without receiving selection the print data from the login user via the operation unit.

2. The image forming apparatus according to claim 1, wherein the voice unit is configured to output the voice data related to a print function when the voice use setting is operational.

3. The image forming apparatus according to claim 2, wherein the voice unit receives voice data received from the login user when a function of the voice unit is operational, and
wherein the print control unit causes the printing unit to print the print data corresponding to the login user stored in the storing unit based on the voice data received from the voice unit.

4. The image forming apparatus according to claim 1, wherein the voice unit is configured to output voice data indicating that printing of the print data corresponding to the login user starts.

5. The image forming apparatus according to claim 1, wherein the setting unit respectively sets the voice setting information for each user.

6. The image forming apparatus according to claim 1, further comprising a display unit configured to display the list of the print data stored in the storage unit, wherein the list displayed by the display unit include a name and print setting information of the print data.

7. The image forming apparatus according to claim 1, wherein the print control unit is configured to cause the login user to select the print data through the list when a function of the voice unit is not operational.

8. A method for controlling an image forming apparatus including a printing unit configured to print an image on a sheet, an operation unit configured to receive a user instruction and a voice unit configured to receive voice input data or output voice data, the method comprising:
storing print data corresponding to a login user in a memory;
setting voice setting information indicating whether or not the voice unit the voice unit is operational;
executing a first print control or a second print control based on the set voice setting information;
wherein the first print control being executed when it is determined that the voice setting information indicates that the voice unit is not operational, the print control unit causes the operation unit to display a list of the print data and causes the printing unit to print the image on the sheet based on receiving selection of the displayed list of the print data from the login user via the operation unit, and
wherein the second print control being executed when it is determined that the voice setting information indicates that the voice unit is operational, the print control unit does not display the print data list and causes the printing unit to print the image automatically on the sheet without receiving selection of the print data from the login user via the operation unit.

9. A non-transitory storage medium storing a computer executable instructions for executing a method for controlling an image forming apparatus including a printing unit configured to print an image on a sheet, an operation unit configured to receive a user instruction and a voice unit configured to receive voice input data or output voice data, the method comprising:
storing printing data displaying a print target list of the printing data corresponding to a login user when voice use setting of the login user is not operational;
setting voice setting information indicating whether or not the voice unit is operational;
executing a first print control or a second print control based on the set voice setting information;
wherein the first print control being executed when it is determined that the voice setting information indicates that the voice unit is not operational, the print control unit causes the operation unit to display the print target list of the printing data causes the printing unit to print the image automatically on the sheet based on receiving selection of the displayed print target list of the print data from the login user via the operation unit, and
wherein the second print control being executed when it is determined that the voice setting information indicates that the voice unit is operational, the print control unit does not display the print data list and causes the printing unit to print the image automatically on the sheet without receiving selectin of the print data from the login user via the operation unit.

* * * * *